3,123,976
OPERATION AND STOPPING MECHANISM FOR PROGRAM CONTROL AND THE LIKE
Geoffrey A. Mansell, San Juan Capistrano, Calif., assignor to Robertshaw Controls Company, a corporation of Delaware
Filed Nov. 21, 1961, Ser. No. 153,960
13 Claims. (Cl. 60—60)

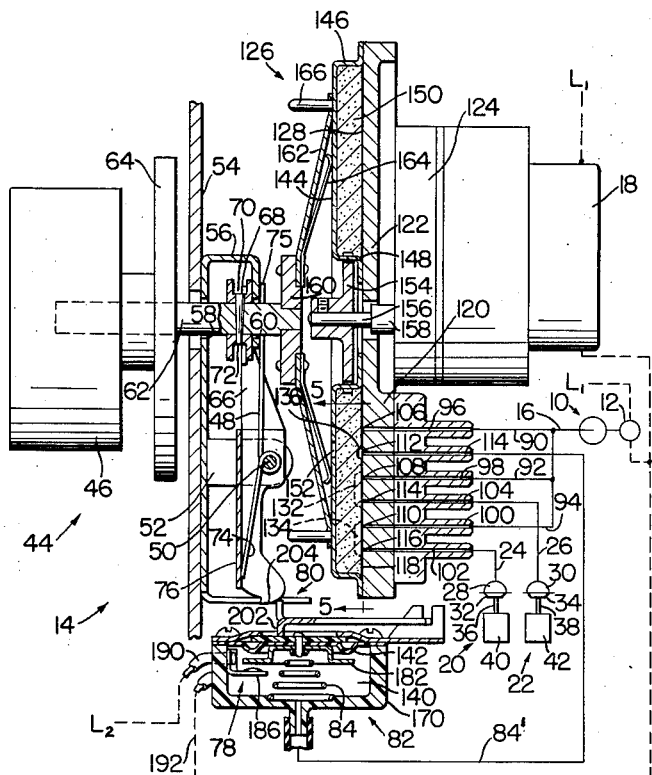
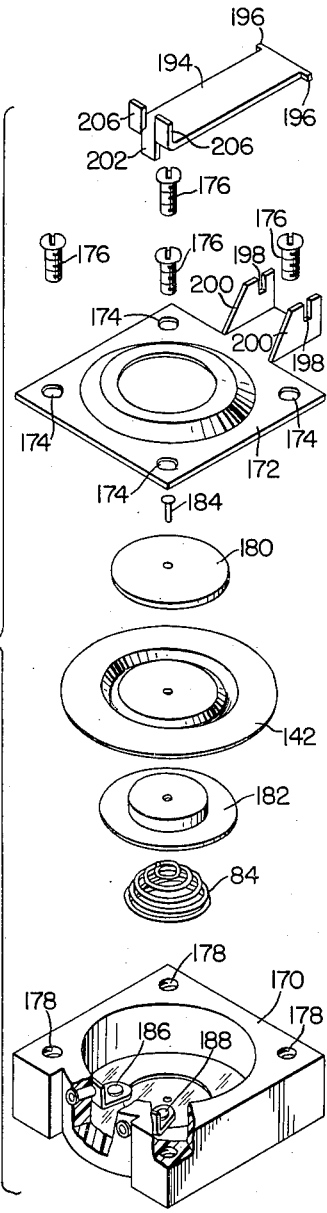
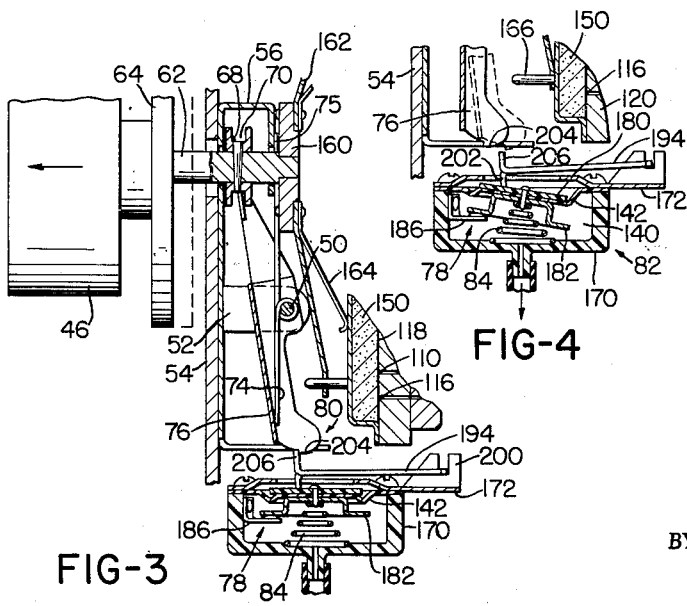
FIG-1
FIG-4
FIG-2
FIG-3
INVENTOR.
GEOFFREY A. MANSELL
BY Robert R Candor
ATTORNEY

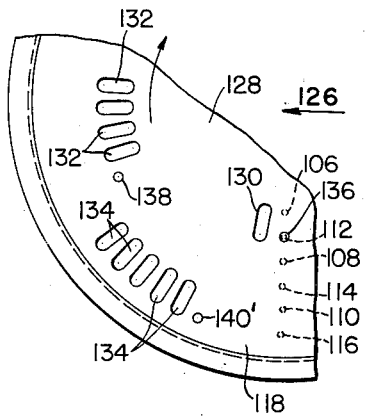
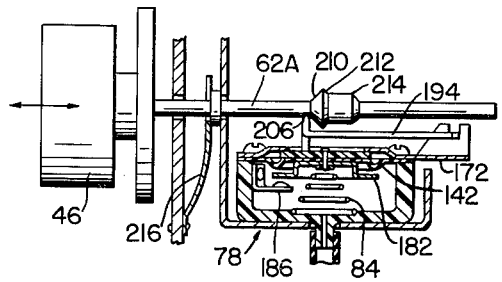
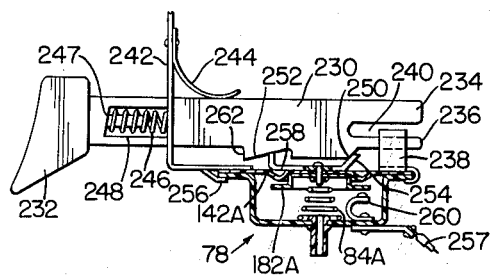
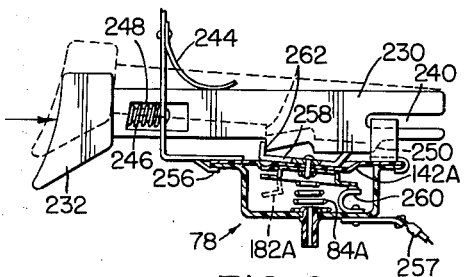
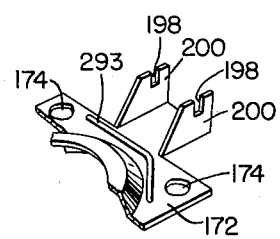
INVENTOR.
GEOFFREY A. MANSELL
ATTORNEY United States Patent Office 3,123,976
Patented Mar. 10, 1964

This invention relates to an operation and stopping construction for controlling the operation and stopping of a device.

This invention may be used to control the operation and stopping action of a device such as program controller and the like, and may be used in connection with any device which is capable of having its operation and stopping action controlled thereby.

For example, switch contact means may be provided which have an operation condition and a stopping condition for controlling the operation and stopping action of the device. Manual means, such as knob or handle, may be movable to "on" and "off" positions to cause operation and stopping action of the device. If desired, the "on" position may be a biased position biased toward the "off" or unbiased position. Latch means may be provided cooperating between the switch contact means and manual means to lock the switch contact means in operation condition and to lock the manual means in "on" position. Stopping means may be provided to release the manual means to move to the "off" position while temporarily maintaining the switch contact means in operation condition and thereafter to move the switch contact means to stopping condition.

Vacuum means may be provided to release the manual means to move to the "off" position while temporarily maintaining the switch contact means in operation condition and thereafter to move the switch contact means to stopping condition.

The device to be controlled by the switch contact means may be a program controller which controls the operation of many devices during a program and which is to be stopped at the end of the program automatically by impulses from the program controller. If the program controller is a vacuum program controller, the vacuum impulses which are controlled by the program controller may be used to operate the stopping switch construction to stop the program controller itself as well as the operation of the devices which are controlled thereby.

Accordingly, it is an object of this invention to provide a program control system having one or more of the features herein disclosed.

Another object of this invention is to provide a switch construction having one or more of the features herein disclosed.

Another object of this invention is to provide a method of operating a program control system and/or a switch construction, and having one or more of the features herein disclosed.

Other objects are apparent from this description, from the appended claims, and from the accompanying drawings in which:

FIGURE 1 is a diagrammatic view, partly in cross section and partly in elevation, of a program system according to this invention, and showing the "off" position.

FIGURE 2 is an exploded view of a switch construction having an operation position and a stop position for operating and stopping the motors of the system.

FIGURE 3 is a view somewhat similar to a portion of FIGURE 1 and showing the parts moved to the "on" operation position.

FIGURE 4 is a view similar to a portion of FIGURE 3 showing the unlatching position.

FIGURE 5 is a view long the line 5—5 of FIGURE 1.

FIGURE 6 is a view showing the switch means connected with a different type of manipulator.

FIGURE 7 is a view showing the switch means connected to a further different type of manipulator, in the "off" position.

FIGURE 8 is a view showing the parts of FIGURE 7 in operation position.

FIGURE 9 is a view similar to a portion of FIGURE 2 and showing latch retaining means.

Certain words are used in this application indicating direction, relative position, etc. These word are used for the sake of brevity and clearness. However, it is to be understood that such words are used in connection with the illustrations in the drawings of the application, and that the actual devices need not have the relative positions or directions shown or described. For example, words which may be used for this purpose are: "below," "horizontal," "vertical," etc.

A system according to this invention, may have, for example, a vacuum pump 10 driven by a pump motor 12. A vacuum program controller 14 may have a suction connection 16 to the intake of the pump 10. A controller motor 18 may drive the controller 14. Vacuum actuator means 20 may actuate mechanism construction 22 to be controlled by the program controller 14. Vacuum producing and breaking means may connect the vacuum actuator means 20 to the program controller 14 and the pump 10. Such means may be in the form of fluid conducting lines 24, 26 which may connect the actuator means to the program controller 14 to be connected and disconnected by the controller with the vacuum pump 10. In addition, the air conducting lines 24 and 26 may be connected by the controller with the atmosphere, to introduce atmospheric air to the vacuum chambers 28 and 30 of the actuator means 20.

The vacuum actuator means 20 may include the one or more vacuum chambers 28 and 30 which cause actuating motion of the diaphragms 32 and 34. The diaphragms 32 and 34 may be connected to the shafts or stems 36 and 38 which operate switches, valves, or other controlling means in the mechanism construction to be controlled, such as the machines or machinery 40 and 42. The members 40 and 42, which are diagrammatically indicated, may be parts of washing machine, if desired, such as water valves, washing machine motors, washing machine transmissions, etc., or any other device or machinery to be controlled by the program controller 14. The diaphragms 32 and 34 are pulled upwardly by vacuum impulses which are produced in the lines 24 and 26. The diaphragms 32 and 34 are moved downwardly, by a spring bias or the like, in the chambers 28 and 30 or in the members 40 and 42, or elsewhere. This downward movement of the diaphragms occurs when the controller 14 connects the lines 24 and/or 26 with the atmosphere to permit atmospheric air to enter the vacuum chambers 28 and 30 to break the vacuum.

Manipulating means 44 may be provided for positioning the controller 14 at any program stage and the like, or otherwise operating the controller. For example, the manipulating means 44 may be a knob or handle 46 which has an "on" position when the handle 46 is moved to its leftmost position and has an "off" position when the handle 46 is moved to its rightmost position. The "on" position may be a biased position biased toward the "off" or unbiased position. The handle 46 may be biased toward the "off" position as by a spring 48, which may be a wire spring wound around the fulcrum pin 50. The fulcrum pin 50 may be carried by a bracket 52 carried by the paneling 54 of the machine on which the controller may be mounted.

The upper end 75 of the spring 48 may bear against the bracket 56 which also forms the bearings or guide openings 58 and 60 for the shaft 62 which is connected to the knob or handle 46. If desired, a dial, indicating the various positions 64, may be placed behind knob 46, so the operator may be informed of the actual position or progress of the program cycle which is being controlled by the controller 14.

A lever 66 may be fulcrumed on the pin 50 and the upper end of the lever 66 may be provided with a flange 68 which rides in the groove 70 of a washer 72, which is keyed or fixed to the shaft 62. The lower end 74 of the spring 48 bears against the lower end 76 of the lever 66 and thus in turn biases the handle 46 rightward toward the "off" position.

Switch means 78 may have an operation or closed position, such as shown in FIGURE 3 and it may have a stop position, such as shown in FIGURE 1, for operating and stopping the program controller 14 by operating and stopping the motors 12 and 18.

Latch means 80 may be operated by the manipulator means 44 to move and latch the switch means 78 in operation, or closed position, such as shown in FIGURE 3 by manual movement of the manipulator or handle 46 to the "on" or leftward position. The switch means 78 thereafter causes the unlatching of latch means 80 to stop operation of the program system 14.

A vacuum actuator construction 82 may be connected to the controller by the air line 84' and may be connectable by the controller 14 to the pump 10 to produce a vacuum in the actuator construction 82 and thereafter may be connected to the atmosphere to break the vacuum in the actuator construction 82 by means of the program construction elsewhere described.

The vacuum actuator construction 82 may unlatch the latch means 80 by an impulse control from the controller 14 near the end of a program when a vacuum is produced in the vacuum actuator construction 82 as shown in FIGURE 4. During this operation as shown in FIGURE 4, the lower end 76 of the lever 66 is released from the dotted line manipulator "on" position shown in FIGURE 4 to the "off" position which corresponds to the full line position of the end of the lever 76 in FIGURE 4. During this handle unlatching operations, the switch means 78 is held in operation or closed position while the program controller 14 is causing a vacuum to be produced in the actuator construction 82.

Thereafter the controller 14 breaks the vacuum in the vacuum actuator construction 82 in a manner to be described and this causes the switch means 78 to assume the open or "stop" position shown in FIGURE 1 because of the breaking of the vacuum of the vacuum construction 82 by the controller 14 at the end of the program, as elsewhere described.

It is thus to be seen that the operator may move the handle 46 to the "on" position, which is a leftward pull in FIGURE 1, and may turn the handle 46 to any desired program position by the turning of the handle 46 by a rotating movement also to turn the shaft 62. This outward pull causes the end 76 of the lever 66 to be latched to hold the handle 46 in its leftward position, as shown in FIGURE 3. This also energizes the motors 12 and 18 by closing the switch construction 78 of FIGURE 3 and causes the program controller 14 to be driven by the motor 18 through a program cycle to be described.

Near the end of the program cycle the controller 14 causes the pump 10 to impose a vacuum on the vacuum actuator construction 82 to move the parts to the position shown in FIGURE 4, wherein the end 76 of the lever 66 is unlatched, and thus permits the spring bias of the handle 46 to move the handle 46 rightward to the "off" position. However, because of the vacuum in the actuator 82, as shown in FIGURE 4, the switch means 78 is maintained in operation or closed position as long as the vacuum is maintained by the program controller 14. The time within which this position is held is relatively short. Thereafter, the program controller breaks the vacuum in the vacuum means 82 as elsewhere described and this allows the spring 84 to open the switch, as shown in FIGURE 1, wherein the switch means 78 is in the open position or in the stopping position and wherein the motors 12 and 18 are stopped.

The parts heretofore broadly described are now to be described in further detail. The pump 10 may be any type of vacuum pump and need not be a high volume vacuum pump, since the amount of air to be withdrawn to maintain the vacuum is relatively small.

The pump suction line 16 may be connected to branch suction passageways or lines 90, 92 and 94, which are connected to suction passageways respectively 96, 98 and 100.

Likewise the lines 24 and 26 may be connected to the passageways 102 and 104. These passageways 96 through 104, FIGURE 1, terminate at their left ends in suction ports 106, 108, and 110 and in discharge ports 112, 114, and 116. These ports 106 through 116 are located on the relatively smooth surface 118 of a pneumatic reading head 120. The reading head 120 may be part of a stationary disc-like solid member 122 which also carries the program motor 18, and its gear box 124. The reading head 120 may be part of a relatively solid plate or disc which exposes a relatively smooth surface and the aligned ports 106–116 for contact by the program producing member 126.

The program controller 14 causes relative movement between program producing member 126 and the reading head 120. The member 126 may have (FIG. 5) a relatively smooth skin or film 128 which may have a plurality of irregularities or indentations 130, 132, and 134. The irregularities may also include holes or openings 136, 138, and 140. The indentations 130, 132, and 134 may be in the form of channels with closed ends which bridge respectively the pairs of ports 106—112, 108—114, and 110—116 on the reading head 120. Whenever any of these indentations 130, 132, and 134 bridge their respective pairs of ports, the respective vacuum actuators are connected to the pump 10, so that a vacuum is produced in the respective vacuum chamber.

The single indentation 130, near the end of the program cycle, bridges the ports 106 and 112 as it passes over them, and causes a vacuum to be produced in the vacuum chamber 140 to pull down the diaphragm 142 to the position shown in FIGURE 4. In the position shown in FIGURE 5, the indentation 130 already has passed the ports 106 and 112 and has already produced the positions shown in FIGURE 4. Opening 136 is now passing over the port 112, so that atmospheric air is entering the port 112 and is flowing through the passageway 114 and tube 84' into the vacuum chamber 140, to break the vacuum in the chamber 140 and allow the diaphragm 142 to return to the position in FIGURE 1 by the action of the spring 84 to open the switch construction 78, and stop operation of the program system.

When the series of indentations 132 passed over the ports 108 and 114 at a previous time in the program, a substantially continuous vacuum was produced in the vacuum chamber 30, so that the diaphragm 34 was raised, together with the stem 38 to actuate the machine 42 or the like. At another time during the program, for example, the indentations 134 passed over the openings or ports 110 and 116 and produced a substantially constant vacuum in the vacuum chamber 28 with the raising of the diaphragm 32 and actuation of the device 40. After the series of indentations 132 passed over the respective ports, the opening 138 passed over the port 114, permitting atmospheric air to enter the port 114 and from thence enter the vacuum chamber 30 where the vacuum was broken. This allowed the diaphragm 34 to move downwardly and to terminate the actuation of the device 42. Likewise, after the series of indentations 134 passed over the ports 110 and 116, the opening 140' passed over the port 116 and broke the vacuum in the vacuum chamber 28 in a similar manner.

The program member 126 may include a relatively rigid backing plate or disc 144 which has outer flanges 146 and inner flanges 148 which carry the filtering material 150, which may also act as a cushion for the skin or film 128. The filtering material 128 may be foam rubber for example. Suitable openings 152 may be provided in the backing member 144, to permit air to enter and pass through the filtering material 150 and from thence pass through the openings 136, 138, and 140' in the film 128 to break the vacuums in the respective vacuum actuators, and to prevent any entrance of dust or the like into the vacuum system when such atmospheric air is being introduced into the system.

The backing member 144 may be carried by a hub 154, which may be driven at relatively slow speed of rotation by the shaft 156. The shaft 156 may be driven by the motor 18 through a speed reduction gear train, not shown, but contained in the gear box 124. A slip clutch, not shown, may be provided at 158 so that the disc or plate 126 may be rotated by the handle 46 without the necessity of rotating the motor 18.

The handle 46 may be rotationally and drivingly connected with the disc 126, so that the rotation of the handle 46 may also rotate the disc 126. To this end, the handle shaft 62 may be provided with a hub 160 which may carry the relatively rigid arms 162 and the relatively weak spring arms 164. The arms 162 may have openings which loosely receive the pins 166 which are secured to the backing member 164. When the handle 46 is moved leftward from the position shown in FIGURE 1, then the arms 162 follow the leftward movement of the handle 46 and slide along the pins 166 but still remain enveloping the pins 166, so that the handle 46 remains rotationally fixed to the vacuum member 126 and thus can rotate the member 126 at all times that the handle 46 is rotated, regardless of whether the handle 46 is in the "on" or "off" position. The light springs 164 gently press the disc 126 rightwardly, and maintain the film 128 at all times in engagement with the reading head 120, regardless of the leftward movement of the handle 46. In this manner, the skin or film 128 remains at all times in program controlling position against the surface 118 of the reading head 120, regardless of any axial movement of the handle 46.

The switch construction or means 78 is shown in exploded view in FIGURE 2. Such means may include an insulating block 170 to which the diaphragm 142 is attached. The diaphragm 142 may be held down against the block 170 by a plate 172 which has openings 174 through which the screw bolts 176 pass and are threadedly engaged in the threaded openings 178 in the block 170. An insulating washer 180 is placed on top of the diaphragm 142, and an electrically conducting bridging disc 182 is placed on the under side of the diaphragm 142. The members 142, 180, and 182 are riveted together by the rivet pin 184. The compression spring 84 has its lower end engaging the floor of the insulating block 170 and its upper end engaging the disc 182.

The bridging and electrically conducting disc 182 bridges the contacts 186 and 188, which are shown near the bottom of FIGURE 2. These contacts are connected to the electric line conductors 190 and 192 of FIGURE 1. The conductor 190 may lead to the line $L_2$ and the conductor 192 may be branched and connected to the respective motors 12 and 18. The other leads of the motors 12 and 18 may be connected to the line $L_1$. Hence, the motors 12 and 18 are energized wherever the bridging member 182 bridges the contacts 186 and 188. In this manner, whenever the switch means 78 is placed in open position, the motors 12 and 18 are stopped and whenever the switch means 78 is in closed position, the motors 12 and 18 are operated.

The latching means 80 may include a latch member 194, FIGURE 2, which has fulcrum extensions 196 which are received in the notches 198 of the wings 200 which are carried by the plate 172. The latch member 194 has a downward flange 202 which presses down on the washer 180 when the latching cam 204, FIGURES 1, 3 and 4, engages the upward flanges 206, or one of them, as the handle 46 is being pulled outwardly. In FIGURE 1, preferably two cams 204 on each side of the lever 66 engage respectively the two upward flanges 206, FIGURE 2, of the cam lever 194. When the handle 46 is pulled leftwardly from the position of FIGURE 1 to the position of FIGURE 3, the cams 204 latch over the ends of the upward flanges 206 to prevent the handle 46 from returning rightwardly until it is released by the action heretofore described when a vacuum is produced in the vacuum chamber 140 to produce the operation shown in FIGURE 4 wherein the diaphragm 142 has been moved downwardly by a vacuum in chamber 140. Thus to unlatch the lower end 76 of the lever 66 and permit the handle 46 to return to its rightward or "off" position under the spring bias of the spring 48, which is more powerful than the combined spring strength of the arms 164.

The cams 204 and 206 have been shown as fully effective and irreversible latch means in FIGURES 1–4, which can be unlatched only by allowing the program controller to run to the end of the cycle, or by manually turning and advancing the handle 46 to the rear of the end of the cycle position heretofore described.

However, the cams 204 and 206 may be tapered in a manner similar to that shown and described in connection with FIGURE 6 so the handle 46 of FIGURES 1–4, when so modified, may be forced manually to "off" position by a force greater than the light spring force of springs 164.

FIGURE 6 shows a switch construction 78 substantially identical to that shown with respect to FIGURES 1 through 4. However, instead of having a lever 66 engage the upward flanges 206 of FIGURE 2 for the latching operation, the shaft 62A may have a cam in the shape of a cone 210 which may press the lever 194 downwardly when the handle 46 is pulled leftwardly to the "on" position. When the handle 46 is pulled leftwardly a sufficient distance, then the latching edge 212 will latch the upward flanges 206 to hold them in engagement with the cylindrical part 214 which will produce a condition substantially the same as in FIGURE 3.

The engaging edges of flanges 206 and of latching edge 212 may be tapered so the flanges 206 will hold the edge 212 in the "on" position against the spring action of spring 216 which biases shaft 62A rightwardly to the "off" position. However, when a greater manual force on handle 46 is added, then the edges at 206 and 212 will yield and allow movement of handle 46 to the "off" position.

When a vacuum is supplied to the switch construction 78 of FIGURE 6 in the manner corresponding to that shown in FIGURE 4, the diaphragm 142 is pulled downwardly in a manner similar to that of FIGURE 4, thus moving the upward flanges 206 below the outermost part of the rim 212 and allowing the handle 46 to be returned to its rightward position by means of the spring 216 which imparts a rightward bias to the shaft 62A. The position of the shaft 62A in FIGURE 6 is the rightmost position or "off" position corresponding to the position of FIGURE 1. The shaft 62A may be connected to a program construction such as shown in FIGURE 1 at the right end of shaft 62A, or the shaft 62A may be connected to any other program construction desired.

FIGURES 7 and 8 show a construction in which the switch means 78 may be identical in general construction to that shown in FIGURES 1 through 4. However, a non-rotatable shaft 230 is manually movable rightward or leftward by a handle 232. The right end of the shaft 230 indicated at 234 has a pin 236 which is held in a U-shaped member 238, so that the shaft 230 may slide back and forth horizontally, but the right end may not be raised any substantial amount. A slot 240 permits the rightward or leftward movement of the shaft 230. The left end of the shaft or rod 230 may pass through a slot in the bracket 242 and may be downwardly pressed by a leaf spring 244. A compression spring 246 may bias the shaft or rod 230 leftwardly, since one end of the spring 246 may engage the bracket 242 while the other end may engage the left end 247 of the slot 248.

A pair of cam surfaces 250 and 252 engage respectively the upward fingers 254 and 256 of the disc or plate 258. These cam surfaces 250 and 252 push the switch construction downward to the closed position shown in FIGURE 8, where the pair of contacts 260 are connected to a suitable pair of conductors 257 which act in a manner substantially similar to that previously disclosed in connection with FIGURES 1 through 5. Other parts of this switch of FIGURES 7 and 8 are substantially identical in function although slightly different in shape from the switch of FIGURES 1 through 4, and it is believed unnecessary to further describe the details thereof. When a vacuum is applied to the construction of FIGURE 8, in a manner corresponding to FIGURE 4, the diaphragm 142A is pulled downwardly to allow the latch portion 262 to pass through leftwardly over the end of vacuum lowered member 256, this allows the rod 230 to snap leftwardly from the "on" position of FIGURE 8 to the "off" position of FIGURE 7 where the switch is opened in a manner corresponding to the position of FIGURE 1.

The handle 232 may be raised in case of emergency, against the action of spring 244 to the dotted line position of FIGURE 8 and in this condition, the rod 230 can move leftwardly and open the switch contacts 260 to stop operation of the program member 14 and of the vacuum pump 10.

The shaft or rod 230 may be an auxiliary shaft and need not have the positioning or turning movement of the shaft 62 or the shaft 62A. However, the structures of FIGURES 7 and 8 may be used as an auxiliary of the construction of FIGURES 1 through 6, in which the handles 46 of FIGURES 1 through 6 will rotate the program construction but will not start or stop it. The starting or stopping of the program would then be performed by the handle 232 which would be auxiliary to the handle 46.

The embodiment of FIGURES 7 and 8 may be used in connection with a rotatable handle and shaft of FIGURE 6 by providing the shaft 62A with a downward leaf spring like 244 of FIGURES 7 and 8 and by providing a U-shaped member like 238 to hold down the right end of shaft 62A. The left end of shaft 62A and handle 46 may be made liftable, as in FIGURES 7 and 8.

It is thus to be seen that a construction has been provided wherein a switch construction may be used which may start, maintain in operation, and stop a program controller, and the same may have its stopping operation controlled by the program member itself. Many other advantages are also present in this construction.

This invention is applicable to many devices and under many different conditions.

For example, as is specifically pointed out with respect to FIGURES 1 through 5 and which is applicable to the other figures, switch contact means, such as 182, 186 and 188, have an operation condition such as shown in FIGURES 3 and 4 and a stopping condition, such as shown in FIGURE 1. Manual means, such as knob 46 is movable to "on" position leftwardly and to "off" position rightwardly to cause operation and stopping respectively of a device, such as program controller 14. Latch means, such as cams 204 and latch bar 194 cooperate between said switch contact means 182, 186, and 188, and said manual means 46 to lock said switch contact means in operation condition, such as shown in FIGURES 3 and 4 and to lock said manual means in "on" position, such as shown in FIGURE 3. Stopping means, such as the vacuum means which are applied to the vacuum chamber 140 and to the diaphragm 142 in cooperation with the spring 84 are operable to release said manual means 46 to move to "off" position while temporarily maintaining the switch contact means 182, 186, and 188 in operation condition, as shown in FIGURE 4, while the vacuum is maintained in the vacuum chamber 140, said means being operable thereafter, as when the vacuum is broken, to move the switch contact means 182, 186, and 188 to stopping condition, such as shown in FIGURE 1.

The device to be controlled by the switch means 182, 186, and 188 is specifically shown as the program controller 14, but other devices may be so controlled by such switch contact means and by the handle 46, as is obvious.

The manual means 46 may be under certain conditions, any movable means having a biased position, such as the "on" position of the handle 46 and having an unbiased position, such as the "off" position of the handle 46.

Under certain conditions, the entire latching means may be built into the switch construction, such as the switch construction shown in FIGURE 2. For example, one or more hooks 293 or the like may be attached to the plate 172 of FIGURE 2, as shown in FIGURE 9, which limit the upward movement of the latch bar 194 beyond a desired limit. Hence the switch construction of FIGURE 2 may be assembled completely and separately from the program device or other device. The latch means or bar 194 can cooperate with any movable member, such as a handle or the like, which has a biased position or "on" position and an unbiased position, or "off" position, and which has some type of latch means to cooperate with the latch means 194 of the switch construction of FIGURE 2.

Thus the switch construction of FIGURE 2, in combination with FIGURE 9, may be manufactured as a unit at one place and may be connected to a device which has a movable member of any type with which the latch means 194 is to cooperate.

A new and useful program controller system and method of operation have therefore been provided.

Also a new and useful switch construction has been provided.

Other new and useful inventive features have been made available by this invention.

While the form of the invention now preferred has been disclosed as required by the statutes, other forms may be used, all coming within the scope of the claims which follow.

What is claimed is:

1. In combination: a vacuum pump; a pump motor driving said pump; a vacuum program controller with a suction connection to said pump; a controller motor driving said controller; vacuum actuator means to actuate mechanism construction to be controlled; vacuum producing and breaking means connecting said vacuum actuator means to said program controller to be connected with and disconnected from said pump by said controller; a manipulating means for positioning said controller and having an "on" position and an "off" position and being biased to said "off" position; switch means having an "operation" position and an "off" position for operating and stopping said motors; latch means operated by said manipulator means to move and latch said switch means in "operation" position by manual movement of said manipulator to "on" position; a vacuum actuator construction connected to said controller and connectable by said controller to said pump, said actuator construction unlatching said latch means, by control of said controller and releasing said manipulating means to "off" position near the end of a program by vacuum action while holding said switch means in "operation" position, said actuator constuction thereafter moving said switch means to "off" position by the breaking of the vacuum of said vacuum construction by said controller at the end of said program.

2. In combination: switch contact means having an "operation" condition and a "stopping" condition for controlling the operation and stopping of a device; manual means movable to "on" and "off" positions to cause operation and stopping of said device; latch means cooperating between said switch contact means and said manual means to lock said switch contact means in "operation" condition and to lock said manual means in "on" position; and stopping means to release said manual means to move to "off" position while temporarily maintaining said switch contact means in "operation" condition and thereafter to move said switch contact means to "stopping" condition.

3. In combination: switch contact means having an "operation" condition and a "stopping" condition for controlling the operation and stopping of a device; manual means movable to "on" and "off" positions to cause operation and stopping of said device; latch means cooperating between said switch contact means and said manual means to lock said switch contact means in "operation" condition and to lock said manual means in "on" position; and vacuum means to release said manual means to move to "off" position while temporarily maintaining said switch contact means in "operation" condition and thereafter to move said switch contact means to "stopping" condition.

4. In combination: switch contact means having an "operation" condition and a "stopping" condition for controlling the operation and stopping of a device; manual means movable to "on" and "off" positions to cause operation and stopping of said device; latch means cooperating between said switch contact means and said manual means to lock said switch contact means in "operation" condition and to lock said manual means in "on" position; and vacuum means operable when a vacuum is applied to said vacuum means to release said manual means to move to "off" position while maintaining said switch contact means in "operation" condition and operable when said vacuum is broken to move said switch contact means to "stopping" condition.

5. In combination: switch contact means having an "operation" condition and a "stopping" condition for controlling the operation and stopping of a device; movable means movable to a biased position and to an unbiased position; first latch means on said movable means; second latch means cooperating with said switch contact means and being cooperable with first latch means on said movable means to lock said switch contact means in "operation" condition and to lock said movable means in biased position; and "stopping" means to release said movable means to move to unbiased position while temporarily maintaining said switch contact means in "operation" condition and thereafter to move said switch contact means to "stopping" condition.

6. A combination according to claim 5 in which said movable means is a manual means and said device is a program controller.

7. A combination according to claim 5 in which said "stopping" means is a vacuum operated means.

8. A combination according to claim 5 in which said movable means is a manual means and said device is a vacuum program controller and said "stopping" means is a vacuum operated means having a vacuum applied thereto and broken by said program controller.

9. In combination: switch contact means having an "operation" condition and a "stopping" condition for controlling the operation and stopping of a device; one latch means cooperating with said contact means and being cooperable with another latch means on a movable means having a biased position and an unbiased position to lock said switch contact means in "operation" condition and to lock said movable means in biased position; and "stopping" means to release said movable means to move to unbiased position while temporarily maintaining said switch contact means in "operation" condition and thereafter to move said switch contact means to "stopping" condition.

10. The method of controlling the operation and stopping of a vacuum program controller system which has a vacuum pump, a motor to drive said pump, a vacuum controller, a controller motor, a vacuum actuator means, a vacuum producing and breaking means, a manipulating means, a switch means and a latch means between said manipulating means, which method comprises latching said manipulating means in "on" position and said switch means in "operation" condition and causing said vacuum controller to control a program cycle of operations, then unlatching said latch means by control of said controller and releasing said manipulating means to "off" position near the end of the program cycle by vacuum action while holding the switch means in "operation" position by vacuum action from said controller and thereafter moving said switch means to "off" position by the breaking of the vacuum by said controller at the end of said program cycle.

11. The method of controlling the operation and stopping of a system having switch contact means having an "operation" condition and a "stopping" condition for controlling the operation and stopping of a device in said system, a manual means movable to "on" and "off" positions to cause operation and stopping of said device, a latch means cooperating between said switch contact means and said manual means to lock said switch contact means in "operation" condition and to lock said manual means in "on" position, which method comprises moving said manual means to "on" position to cause operation of said system and near the end of the desired operation causing "stopping" means to release said manual means to move to "off" position while temporarily maintaining said switch contact means in "operation" condition, and thereafter to move said switch contact means to "stopping" condition.

12. In combination: a cup shaped insulating casing forming part of a vacuum chamber; a diaphragm secured to the rim of said casing to form a cover for said vacuum chamber; separate switch contacts carried by said casing in said chamber; a bridging switch contact means carried by said diaphragm in said chamber and movable by said diaphragm into bridging contact and out of bridging contact with said switch contacts; a first latch member carried by said diaphragm to engage a second latch member on a movable member in biased condition; spring means to hold said latch members together; and a conduit connection with said vacuum chamber to produce a vacuum in said chamber to pull said first latch member out of latching engagement with said second latch member to release said movable member to an unbiased position while maintaining said bridging contact means in bridging contact with said switch contacts, said conduit connection also thereafter to break said vacuum to cause said spring means and diaphragm to move said bridging switch contact out of bridging contact with said separate switch contacts.

13. A combination according to claim 12 in which said spring means is in the form of a compression spring in said vacuum chamber opposing bridging contact of said bridging switch contact with said separate switch contacts, and yielding to the production of said vacuum.

References Cited in the file of this patent

UNITED STATES PATENTS

| | | |
|---|---|---|
| 2,607,207 | Branson | Aug. 19, 1952 |
| 2,961,833 | Schwartz | Nov. 29, 1960 |
| 3,030,778 | Taylor | Apr. 24, 1962 |